Figure 1:
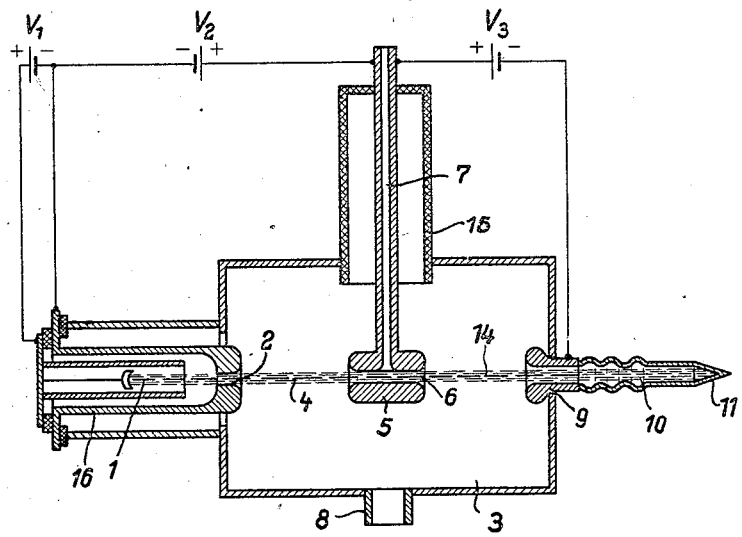

July 29, 1941.  
HARTMUT ISRAEL KALLMANN, FORMERLY KNOWN AS HARTMUT KALLMANN ET AL  
2,251,190

METHOD OF PRODUCING NEUTRONS

Filed March 10, 1939

Inventors:
Hartmut Israel Kallmann,
Ernst Kuhn,
By Potter, Pierce & Scheffler,
Attorneys.

Patented July 29, 1941

2,251,190

UNITED STATES PATENT OFFICE 2,251,190

METHOD OF PRODUCING NEUTRONS

Hartmut Israel Kallmann, formerly known as Hartmut Kallmann, Berlin-Charlottenburg, and Ernst Kuhn, Berlin, Germany, assignors to I. G. Farbenindustrie Aktiengesellschaft, Frankfort-on-the-Main, Germany, a corporation of Germany Application March 10, 1939, Serial No. 261,156
In Germany March 16, 1938

16 Claims.  (Cl. 250—84)

This invention relates to a method for the production of neutrons, particularly by the interaction of deuterons.

In order to obtain neutrons with the aid of ions with relatively slight acceleration (for instance 300 kv.) the nuclear reaction $$D+D=He_3+n$$

is employed. The procedure in this connection is to bombard a layer containing heavy hydrogen nuclei with heavy hydrogen ions or deuterons. For the layer containing hydrogen, use is often made of ice, sal ammoniac, phosphoric acid and similar substances in which ordinary hydrogen is replaced by heavy hydrogen. These layers very rich in hydrogen have the disadvantage that they conduct heat and electricity poorly and are therefore easily destroyed by ionic bombardment. It would be better if more resistant layers were used, for instance, metallic layers. That is possible, however, only when metals that contain large amounts of dissolved or adsorbed hydrogen are employed. These are a few such metals, but they have the disadvantage that they gradually give off hydrogen in the vacuum. It would be still better therefore if substances could be used that contain hydrogen adsorbed only on the surface or in a surface layer but give it off to the outside less easily. These substances placed in the ion stream give only a small output of neutrons when impinged on vertically since the thickness of the adsorbed hydrogen layer is very small in comparison with the range of the ions projected into the metal. Nuclear processes can occur therefore only in a fractional portion of the path of the ions. In case, however, the path of the ions is maintained as nearly as possible entirely within the thin hydrogen layer, a large neutron output is obtained with the aid of these thin adsorbed hydrogen layers.

A principal purpose of the invention is the provision of a highly efficient method for the production of neutrons by the interaction of deuterons. According to the invention this is attained by allowing the stream of ions to impinge on the layer at an angle,—preferably in as grazing a manner as possible.

The adsorption layer containing hydrogen need not consist of pure hydrogen. It might under certain conditions be more advantageous if the adsorption layer consists of gases or vapors containing hydrogen, for instance, methane or water. This is particularly satisfactory when these substances are adsorbed especially strongly.

The body impinged on by the ions is preferably made of a substance that strongly adsorbs the molecules containing heavy hydrogen and at the same time possesses only a slight retarding capacity for the impinging ions. Carbon and beryllium have been found useful for these reasons. It is especially desirable to employ substances that adsorb the molecules containing hydrogen in as thick a layer as possible. This can be accomplished for instance by using, as adsorption body, a substance that is porous or roughened at least at the surface.

The surface of the adsorbing body is heated up by the energy of the impinging ions. In this way the giving off of the adsorbed substance is promoted. It is, therefore, advisable to cool the adsorbing body. This cooling has the advantage, moreover, that at low temperature the adsorbed layer adheres much more firmly. A reduction of the temperature of only 10° C., for instance from 20° C. room temperature to 10° C., can produce a considerable improvement. In many cases, it is advisable to use solid carbon dioxide or even liquid air for the cooling.

The adsorbed layer can be produced in the usual way, for instance by taking up heavy hydrogen or molecules containing heavy hydrogen from the surroundings, for instance from the gas chamber; but it may also be produced by bombarding the surface with heavy hydrogen ions. It is advisable to free the surface intended for the adsorption of heavy hydrogen as far as possible from other adsorbed molecules, such as ordinary hydrogen, for example, by heating in vacuum.

The replacement of the hydrogen given off during the ion bombardment can be accomplished, for instance, by simultaneous or subsequent bombardment with ions containing heavy hydrogen. This bombardment can be accomplished, for instance, with advantage from a different direction, for example, from the back or at a more acute angle from the front, than the bombardment for producing neutrons. The replacement of the heavy hydrogen may be accomplished, for example, by diffusion or by adsorption from the surroundings.

Figure 2:
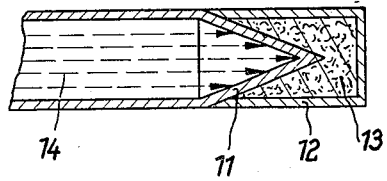

The principles of the invention are illustrated in the accompanying drawing in which:

Fig. 1 is a diagrammatic representation of apparatus embodying the principles of the invention; and Fig. 2 is a partial diagrammatic representation of a modified embodiment of the invention.

In Fig. 1 a beam of high velocity ions of heavy hydrogen 14 is produced by the device described in copending application Serial No. 234,504 of Kuhn and Kallmann, filed October 11, 1938. In this device a beam of negative ions 4 generated at cathode 1 and focussed at 2 by electrode 16 is transformed into a beam of positive heavy hydrogen ions of increased velocity by means of the transforming electrode 5, supported in space 3 by tube 7 and insulator 15. A low pressure is maintained in 3 by means of a pump (not shown) connected at 8. A stream of heavy hydrogen is supplied to channel 6 through tube 7. The high velocity beam of heavy hydrogen ions obtained in this manner passes through apertured member 9 into cathode 10 where they impinge at a grazing angle on the target 11. The high velocity heavy hydrogen ions in the beam react with heavy hydrogen adsorbed on the surface of 11 to produce neutrons.

In the form shown in Fig. 2, a supply of heavy hydrogen is maintained on target 11 by diffusion into 11 of a substance 13 containing heavy hydrogen which is maintained in capsule 12.

We claim:

1. A method for the production of neutrons which comprises bombarding a body containing heavy hydrogen adsorbed in its surface with heavy hydrogen ions impinging thereon at a substantial angle to the normal.

2. A method for the production of neutrons which comprises bombarding a body containing heavy hydrogen adsorbed in its surface with heavy hydrogen ions impinging thereon at a grazing angle.

3. A method for the production of neutrons which comprises bombarding a body containing heavy hydrogen adsorbed in its surface with heavy hydrogen ions impinging thereon at a substantial angle to the normal while cooling the body to a temperature below room temperature.

4. A method for the production of neutrons which comprises bombarding a body containing heavy hydrogen adsorbed in its surface with heavy hydrogen ions impinging thereon at a substantial angle to the normal and replacing the adsorbed heavy hydrogen by bombardment of said body with heavy hydrogen ions.

5. A method for the production of neutrons which comprises bombarding a body containing heavy hydrogen adsorbed in its surface with heavy hydrogen ions impinging thereon at a substantial angle to the normal and replacing the adsorbed heavy hydrogen by diffusion of substances containing heavy hydrogen into the body.

6. A method for the production of neutrons which comprises bombarding a body containing heavy hydrogen adsorbed in its surface with heavy hydrogen ions impinging thereon at a substantial angle to the normal and continuously replacing the adsorbed heavy hydrogen during the bombardment.

7. A method for the production of neutrons which comprises bombarding a body comprising carbon and containing heavy hydrogen adsorbed in its surface with heavy hydrogen ions impinging thereon at a substantial angle to the normal.

8. A method for the production of neutrons which comprises bombarding a body comprising beryllium and containing heavy hydrogen adsorbed in its surface with heavy hydrogen ions impinging thereon at a substantial angle to the normal.

9. A method for the production of neutrons which comprises bombarding a body, at least the surface portion of which is porous, containing heavy hydrogen adsorbed in its surface with heavy hydrogen ions impinging thereon at a substantial angle to the normal.

10. A device for the production of neutrons comprising means for generating a beam of heavy hydrogen ions, and a body containing heavy hydrogen adsorbed in the surface thereof positioned in said beam with said surface at an acute angle to the direction of travel thereof.

11. A device for the production of neutrons comprising means for generating a beam of heavy hydrogen ions, and a body containing heavy hydrogen adsorbed in the surface thereof positioned in said beam with said surface at a grazing angle to the direction of travel thereof.

12. A device for the production of neutrons comprising means for generating a beam of heavy hydrogen ions, a body containing heavy hydrogen adsorbed in the surface thereof positioned in said beam with said surface at an acute angle to the direction of travel thereof, and means for supplying heavy hydrogen to said body.

13. A device for the production of neutrons comprising means for generating a beam of heavy hydrogen ions, and a body comprising carbon and containing heavy hydrogen adsorbed in the surface thereof positioned in said beam with said surface at an acute angle to the direction of travel thereof.

14. A device for the production of neutrons comprising means for generating a beam of heavy hydrogen ions, and a body comprising beryllium and containing heavy hydrogen adsorbed in the surface thereof positioned in said beam with said surface at an acute angle to the direction of travel thereof.

15. A device for the production of neutrons comprising means for generating a beam of heavy hydrogen ions, and a body having a porous surface and containing heavy hydrogen adsorbed in the surface thereof positioned in said beam with said surface at an acute angle to the direction of travel thereof.

16. A method for the production of neutrons which comprises bombarding a body with heavy hydrogen ions impinging on the body at a substantial angle to the normal, said body having a high adsorptive capacity for a substance containing heavy hydrogen and having a low retarding effect upon impinging heavy hydrogen and containing heavy hydrogen adsorbed in its surface.

HARTMUT ISRAEL KALLMANN,
*Formerly known as Hartmut Kallman.*
ERNST KUHN.